(12) United States Patent  (10) Patent No.: US 7,584,273 B2
Shibata  (45) Date of Patent: *Sep. 1, 2009

(54) METHOD AND APPARATUS FOR DATA COMMUNICATIONS CAPABLE OF AUTOMATICALLY SENDING A MAINTENANCE REQUEST

(75) Inventor: Hiroshi Shibata, Kanagawa-ken (JP)

(73) Assignee: Ricoh Company, Ltd., Tokyo (JP)

(*) Notice: Subject to any disclaimer, the term of this patent is extended or adjusted under 35 U.S.C. 154(b) by 582 days.

This patent is subject to a terminal disclaimer.

(21) Appl. No.: 09/846,991

(22) Filed: May 1, 2001

(65) Prior Publication Data

US 2002/0008883 A1    Jan. 24, 2002

(30) Foreign Application Priority Data

May 2, 2000     (JP)     ............................. 2000-133419

(51) Int. Cl.
  *G06F 15/16*  (2006.01)
  *G06F 15/173*  (2006.01)
(52) U.S. Cl. ...................... 709/223; 709/206; 709/207
(58) Field of Classification Search .................. 709/223, 709/206, 207
  See application file for complete search history.

(56) References Cited

U.S. PATENT DOCUMENTS

| | | | | |
|---|---|---|---|---|
| 4,583,834 A | * | 4/1986 | Seko et al. ...................... | 399/8 |
| 5,200,779 A | * | 4/1993 | Nawata ......................... | 399/24 |
| 5,345,297 A | * | 9/1994 | Katakabe et al. ............. | 399/263 |
| 5,414,494 A | * | 5/1995 | Aikens et al. ................. | 399/1 |
| 5,594,529 A | * | 1/1997 | Yamashita et al. ............. | 399/8 |
| 5,612,902 A | * | 3/1997 | Stokes ......................... | 702/85 |
| 5,666,294 A | * | 9/1997 | Takada et al. ............... | 702/182 |
| 5,786,994 A | * | 7/1998 | Friz et al. ..................... | 700/79 |
| 5,850,583 A | * | 12/1998 | Song et al. .................... | 399/24 |
| 5,873,009 A | * | 2/1999 | Yamashita et al. ............. | 399/8 |

(Continued)

FOREIGN PATENT DOCUMENTS

JP    2051968    2/1990

(Continued)

OTHER PUBLICATIONS

October 2, 2007 Japanese official action (and English translation thereof) in connection with Japanese patent application No. 2000-133419.

*Primary Examiner*—William C Vaughn, Jr.
*Assistant Examiner*—Kristie D Shingles
(74) *Attorney, Agent, or Firm*—Cooper & Dunham, LLP

(57) ABSTRACT

A data terminal apparatus includes a communications mechanism, a detector, a register, and a controller. The communications mechanism performs electronic communications with a manager supervising the apparatus. The detector detects a status of usage of a consumable product used in the apparatus and supplied by a service depot. The register registers electronic communications addresses of the manager and the service depot, identification of the apparatus, specification of the consumable product, and identification of the service depot. The controller sends a request for supplying the consumable product to the manager when the detector detects that the consumable product is nearly ended. The request includes the identification of the apparatus, the specification of the consumable product, and the identification of the service depot. Further, the controller sends a report for reporting a completion of supplying the consumable product on the apparatus when the detector detects that the consumable product is refilled.

14 Claims, 12 Drawing Sheets

U.S. PATENT DOCUMENTS

| | | | |
|---|---|---|---|
| 5,901,286 A * | 5/1999 | Danknick et al. ............ 709/203 |
| 6,003,070 A * | 12/1999 | Frantz ....................... 709/206 |
| 6,003,078 A * | 12/1999 | Kodimer et al. ............. 709/224 |
| 6,029,198 A * | 2/2000 | Iizuka ........................ 709/223 |
| 6,088,125 A * | 7/2000 | Okada et al. ................ 358/405 |
| 6,116,722 A * | 9/2000 | Sato et al. .................... 347/85 |
| 6,181,886 B1 * | 1/2001 | Hockey et al. ................ 399/35 |
| 6,219,718 B1 * | 4/2001 | Villalpando ................. 719/317 |
| 6,302,527 B1 * | 10/2001 | Walker ........................ 347/50 |
| 6,333,790 B1 * | 12/2001 | Kageyama ................ 358/1.15 |
| 6,334,658 B1 * | 1/2002 | Suzuki .......................... 347/7 |
| 6,405,178 B1 * | 6/2002 | Manchala et al. ............. 705/29 |
| 6,519,552 B1 * | 2/2003 | Sampath et al. ............. 702/183 |
| 6,522,421 B2 * | 2/2003 | Chapman et al. ........... 358/1.15 |
| 6,613,247 B1 * | 9/2003 | Hohn et al. ............ 252/301.36 |
| 6,629,134 B2 * | 9/2003 | Hayward et al. ............ 709/217 |
| 6,665,425 B1 * | 12/2003 | Sampath et al. ............. 382/112 |
| 6,754,707 B2 * | 6/2004 | Richards et al. ............ 709/227 |
| 6,785,015 B1 * | 8/2004 | Smith et al. ................ 358/1.15 |
| 6,892,317 B1 * | 5/2005 | Sampath et al. ................ 714/4 |
| 7,296,739 B1 * | 11/2007 | Mo et al. .................... 235/385 |
| 2003/0005107 A1 * | 1/2003 | Dulberg et al. ............. 709/223 |
| 2003/0041098 A1 * | 2/2003 | Lortz ......................... 709/203 |
| 2003/0169450 A1 * | 9/2003 | Kawai ....................... 358/1.15 |

FOREIGN PATENT DOCUMENTS

| | | |
|---|---|---|
| JP | 7170357 | 7/1995 |
| JP | 10207304 | 8/1998 |
| JP | 11-32069 | 2/1999 |
| JP | 11-88635 | 3/1999 |
| JP | 11-205362 | 7/1999 |
| JP | 2000-22922 | 1/2000 |

* cited by examiner

FIG. 3

| | | |
|---|---|---|
| TERMINAL INFORMATION | SERIAL NUMBER | 0987654321 |
| | E-MAIL ADDRESS | fax@abc.com |
| | FACSIMILE NUMBER | 123-4567 |
| | TTI INFORMATION | ABC SYSTEM INC., SALES DEPARTMENT |
| MANAGER INFORMATION | E-MAIL ADDRESS | manager@abc.com |
| INFORMATION OF SERVICE DEPOT | E-MAIL ADDRESS | service@aaa.com |
| | FACSIMILE NUMBER | 555-6666 |

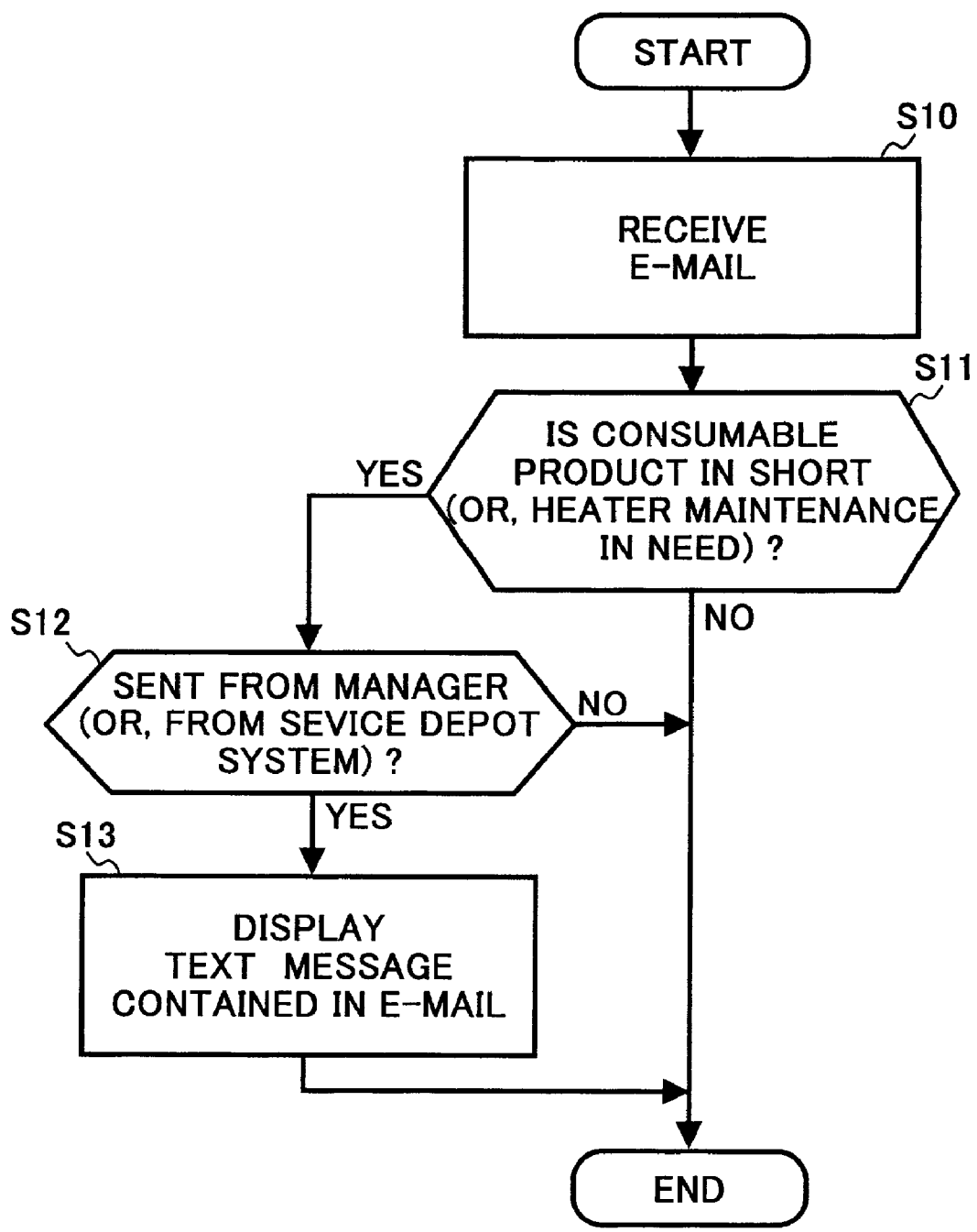

FIG. 6A

```
TO: manager@abc.com
FROM: fax@abc.com
SUBJECT: TONER NEAR-END NOTIFICATION
========================================

TONER IS IN SHORT.
IN CASE OF NO STOCK, PLEASE TRANSFER
THIS MESSAGE TO THE SERVICE DEPOT.

-- CONSUMABLE PRODUCT ORDER FROM --

<ORDER TO>
E-MAIL ADDRESS: service@aaa.com

<INFORMATION OF CONSUMABLE PRODUCT>
STATUS: TONER NEAR-END
PRODUCT NAME: TONER TYPE 2

<ORDER FROM>
E-MAIL ADDRESS: fax@abc.com
SERIAL NO.: 0987654321
SENDER: ABC SYSTEMS, INC.
          SALES DEPARTMENT
```

FIG. 6B

```
■ PLEASE SUPPLY TONER

TRANSMITTABLE
```

FIG. 7A

TO: fax@abc.com, manager@abc.com
FROM: service@aaa.com
SUBJECT: TONER ORDER RECEIPT ACK
========================================

TONER WILL BE DELIVERED 14:00 ON
30TH OF AUGUST.

FIG. 7B

■ PLEASE SUPPLY TONER
   DELIVERABLE 14:00, AUG. 30

TRANSMITTABLE

FIG. 8A

```
TO: manager@abc.com
FROM:  fax@abc.com
SUBJECT: TONER REFILLING COMPLETION
==========================================

TONER HAS BEEN REFILLED.

E-MAIL ADDRESS: fax@abc.com
SERIAL NO.: 0987654321
SENDER: ABC SYSTEMS, INC.
        SALES DEPARTMENT
```

TRANSMITTABLE

FIG. 9A

```
TO: service@aaa.com
CC: manager@abc.com
FROM: fax@abc.com
SUBJECT: HEATER DEFECT NOTIFICATION
==========================================
HEATER IS DEFECTIVE.
PLEASE FIX IT URGENTLY.

-- SERVICE MAINTENANCE STATUS FORM --

<ORDER TO>
E-MAIL ADDRESS: service@aaa.com

<INFORMATION OF MAINTENANCE>
STATUS: DEFECT OF HEATER
ERROR CODE: 5-51

<ORDER FROM>
E-MAIL ADDRESS: fax@abc.com
SERIAL NO.: 0987654321
SENDER: ABC SYSTEMS, INC.
        SALES DEPARTMENT
```

FIG. 9B

■ HEATER IS DEFECTIVE. NO PRINT.

TRANSMITTABLE

FIG. 10A

TO: fax@abc.com, manager@abc.com
FROM:   service@aaa.com
SUBJECT:  REPAIR ORDER RECEIPT ACK
========================================

REPAIR WILL BE PERFORMED 14:00 ON
30TH OF AUGUST.

FIG. 10B

■ HEATER IS DEFECTIVE. NO PRINT.
    REPAIR 14:00 ON 30TH OF AUGUST.

TRANSMITTABLE

FIG. 11A

```
TO: service@aaa.com
CC:manaer@abc.com
FROM:  fax@abc.com
SUBJECT:  REPAIR COMPLETION
========================================

DEFECTIVE HEATER HAS BEEN REPAIRED.

E-MAIL ADDRESS:  fax@abc.com
SERIAL NO.: 0987654321
SENDER: ABC SYSTEMS, INC.
          SALES DEPARTMENT
```

TRANSMITTABLE

FIG. 12A

TO: fax@abc.com
FROM: manager@abc.com
SUBJECT: REPAIR INTERMEDIATE REPORT
========================================

REPAIR WILL BE PERFORMED 14:00 ON
30TH OF AUGUST.
PLEASE USE MACHINE OF DESIGN DIV.

FIG. 12B

■ HEATER IS DEFECTIVE. NO PRINT.
  REPAIR 14:00 ON 30TH OF AUGUST.
  PLEASE USE MACHINE OF DESIGN DIV.
  TRANSMITTABLE

METHOD AND APPARATUS FOR DATA COMMUNICATIONS CAPABLE OF AUTOMATICALLY SENDING A MAINTENANCE REQUEST

BACKGROUND

1. Field

The present application relates to a method and apparatus for data communications, and more particularly to a method and apparatus for data communications capable of automatically sending a maintenance request.

2. Description of the Background Arts

Image forming devices including copying machines, facsimile machine, printers, and also multi function devices made by combining such machines can receive maintenance services from a service depot. When an apparatus has a component which is defective or a consumable product whose life ends or is about to end, a user sends a request to a service depot for a repair service or a delivery of the consumable product.

For example, a Published Japanese Unexamined Patent Application, No. 2-51968 (1990), discusses an apparatus capable of registering a list of consumable products in use and sending a facsimile message to a designated service depot when one of the consumable products need replacement so as to receive a delivery of the necessary consumable product from the service depot.

As another example, a Japanese Patent, No. 2744768, discusses an image forming apparatus capable of sending a facsimile message to a designated service depot of a problem that has occurred in the apparatus.

As another example, a Published Japanese Unexamined Patent Application, No. 10-207304, discusses a facsimile machine capable of handling E-mail communications through the Internet and using E-mail to communicate with a service depot for a request of various services.

However, in the above proposals, the request for the various services is directly sent to the service depot without notifying a manager or administrator who supervises equipment used in an office, including the above conventional devices. As a result, the manager may not have knowledge about services requested of or provided by the service depot.

SUMMARY

The present application describes a novel data terminal apparatus. In one example, a novel data terminal apparatus includes a communications mechanism, a detector, a register, and a controller. The communications mechanism is configured to perform electronic communications with a manager supervising the apparatus. The detector detects a status of usage of a consumable product used in the apparatus and supplied by a service depot. The register registers electronic communications addresses of the manager and the service depot, identification of the apparatus, specification of the consumable product, and identification of the service depot. The controller is configured to send a request for supplying the consumable product to the manager using the electronic communications address when the detector detects that the consumable product needs or soon needs replacement or replenishment. At this time, the request includes the identification of the apparatus, the specification of the consumable product, and the identification of the service depot. Further, the controller is configured to send a report for reporting a completion of supplying the consumable product on the apparatus when the detector detects that the consumable product is refilled.

The communications mechanism may perform E-mail communications with the manager.

The consumable product may include toner.

The communications mechanism may perform facsimile communications with the manager.

The present application further describes a novel data terminal apparatus. In one example, a novel data terminal apparatus includes a communications mechanism, a detector, a register, and a controller. The communications mechanism is configured to perform electronic communications with a manager supervising the apparatus and a service depot providing a repair service to the apparatus. The detector detects an event that a maintenance component used in the apparatus is defective or at the end of its useful life. The register registers electronic communications addresses of the manager and the service depot, identification of the apparatus, and information of the event, and identification of the service depot. The controller is configured to send a request for the repair service to the manager and the service depot using the respectively registered electronic communications addresses when the detector detects the event. At this time, the request includes the identification of the apparatus, the specification of the maintenance component, and the identification of the service depot. Further, the controller sends a report for reporting a completion of the repair service on the apparatus when the detector detects no defect of the maintenance component.

The communications mechanism may perform E-mail communications with the manager and the service depot.

The maintenance component may include a photoconductor.

The communications mechanism may perform facsimile communications with the manager and the service depot.

Further, the present application describes a novel method of ordering a consumable product of a communications terminal apparatus. In one example, a novel method includes the steps of registering, detecting, sending, determining, and reporting. The registering step registers electronic communications addresses of a manager supervising the apparatus and a service depot supplying the consumable product, identification of the apparatus, specification of the consumable product, and identification of the service depot. If the detecting step detects that a consumable product needs replacement/replenishment, the sending step sends a request for supplying the consumable product to the manager using the electronic communications address, the request including the identification of the apparatus, the specification of the consumable product, and the identification of the service depot. The determining step determines that the consumable product has been supplied to the apparatus. The reporting step reports to the manager a completion of supplying the consumable product on the apparatus.

The sending and reporting steps may perform E-mail communications with the manager.

The consumable product may include toner.

The communications mechanism may perform facsimile communications with the manager.

Further, the present application describes a method of ordering a repair service for a communications terminal apparatus. In one example, a novel method includes the steps of registering, detecting, sending, determining, and reporting. The registering step registers electronic communications addresses of a manager supervising the apparatus and a service depot providing a repair service, identification of the apparatus, specification of a maintenance component, and identification of the service depot. If the detecting step detects that a maintenance component is defective, or needs replacement, the sending step sends a request for the repair service to the manager and the service depot using the respectively registered electronic communications addresses, the request including the identification of the apparatus, the specification of the maintenance component, and the identification of the service depot. The determining step determines that the maintenance component is not defective. The reporting step reports to the manager a completion of performing the repair service on the apparatus.

The sending and reporting steps may perform E-mail communications with the manager and the service depot.

The maintenance component may include a photoconductor.

The sending and reporting steps may perform facsimile communications with the manager and the service depot.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein:

FIG. 3 is a table for explaining the contents of a registration unit included in the Internet facsimile apparatus of FIG. 1;

FIG. 5 is a flowchart for explaining an exemplary procedure of handling of E-mail sent from a service depot;

FIGS. 6A-8B are illustrations for explaining the contents of E-mail exchanged for the case of the toner refilling between the Internet facsimile and the service depot and the respective messages displayed on an LCD; and FIGS. 9A-12B are illustrations for explaining the contents of E-mail exchanged for the case of the maintenance requirement between the Internet facsimile and the service depot and the respective messages displayed on an LCD.

DETAILED DESCRIPTION

Figure 1:
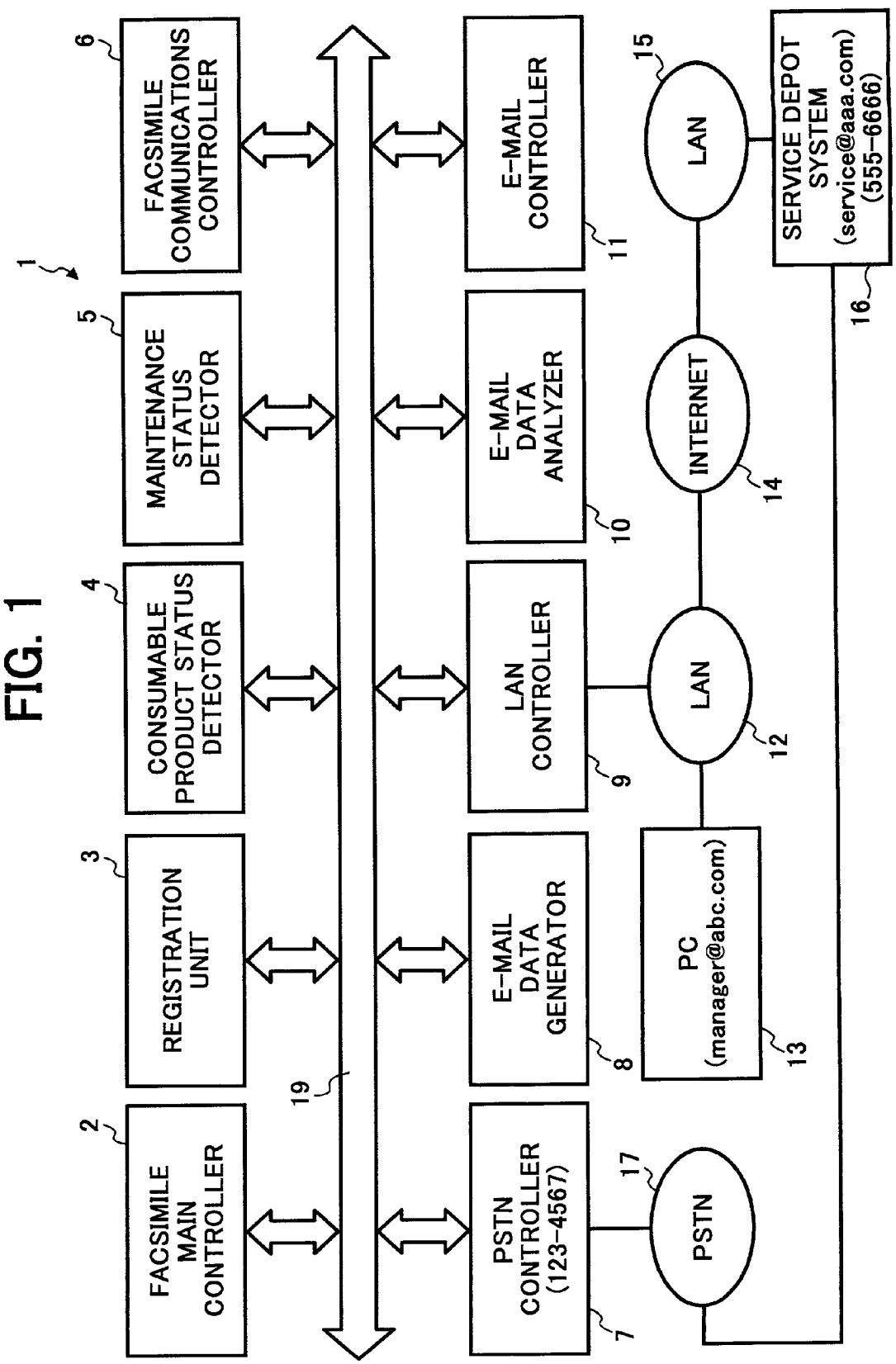
FIG. 1 is a block diagram of an Internet facsimile apparatus according to a preferred embodiment.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numeral designate identical or corresponding parts throughout the several views, particularly to FIG. 1, an Internet facsimile apparatus 1 according to an embodiment of the present application is described. The Internet facsimile apparatus 1 of FIG. 1 includes a facsimile main controller 2, a registration unit 3, a consumable product status detector 4, a maintenance status detector 5, a facsimile communications controller 6, a PSTN (public switched telephone network) controller 7, an E-mail data generator 8, a LAN (local area network) controller 9, an E-mail data analyzer 10, and an E-mail controller 11. These components are connected with each other via a data bus 19.

The LAN controller 9 of the Internet facsimile apparatus 1 is connected to a PC (personal computer) 13 used by a manager of an office via a LAN (local area network) 12 which services the office and is connected to the Internet 14. The Internet 14 is connected to a service depot system 16 via another LAN (local area network) 15. The service depot system 16 is also connected to the PSTN controller 7 of the Internet facsimile apparatus 1 via a PSTN (public switched telephone network) 17.

In the preferred embodiment, a communications system is established in which the Internet facsimile apparatus 1 can communicate with the PC 13 by exchanging E-mail via a mail server (not shown) hooked on the LAN 12 and with the service depot system 16 by exchanging E-mail via the LAN 12 and a facsimile message via the PSTN 17.

The Internet facsimile apparatus 1, the PC 13, and the service depot system 16 exchange E-mail each other through transmission using a SMTP (simple mail transfer protocol) and a POP3 (post office protocol version 3) via mail servers provided to the LANs 12 and 15.

More than one unit of the PC 13 may be connected to the LAN 12 so that use of the Internet facsimile apparatus 1 may be managed by the plurality of the PC 13, for example, when two or more managers (administrators) are involved.

Figure 2:
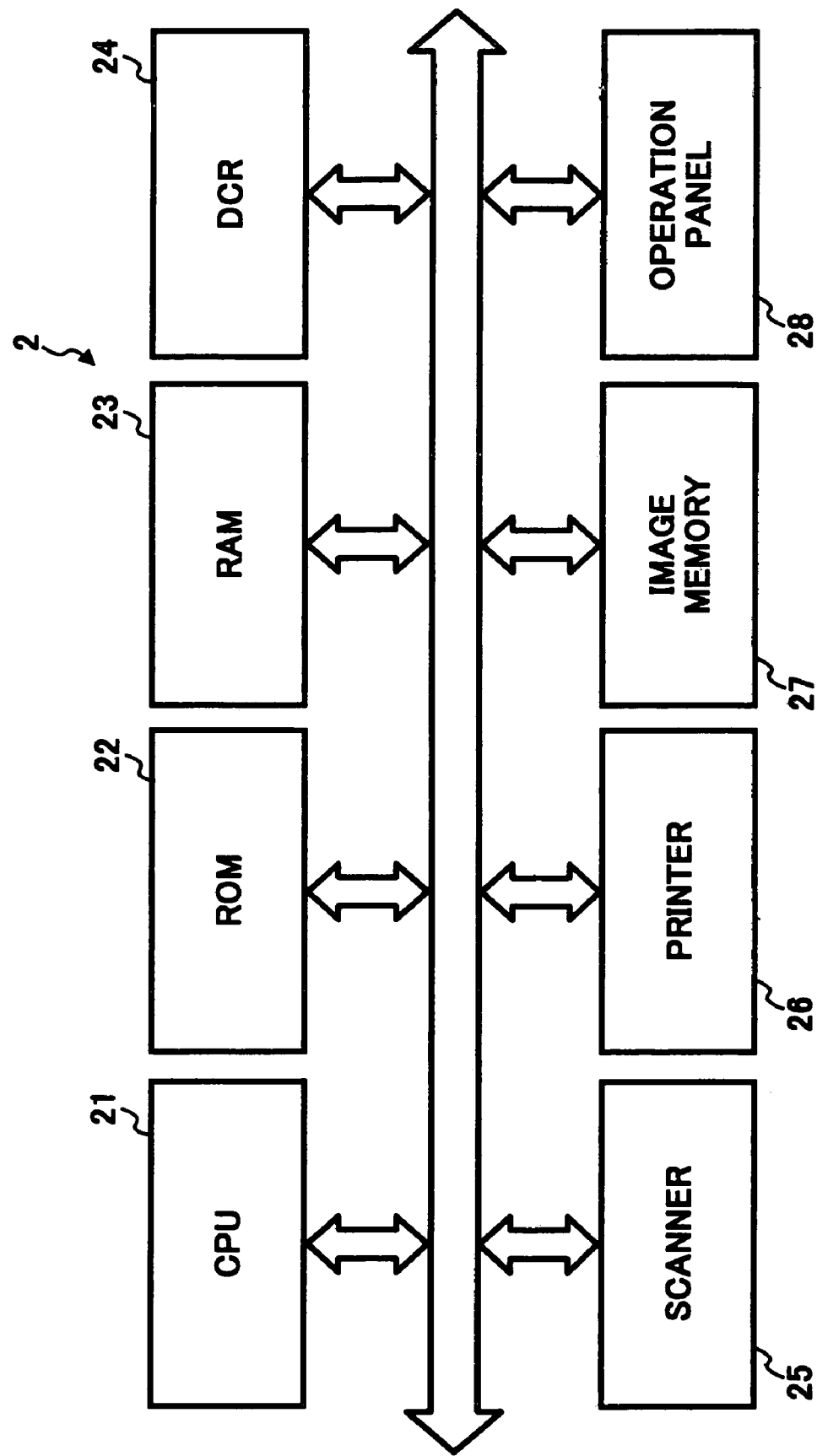
FIG. 2 is a block diagram of a facsimile main controller of the Internet facsimile apparatus of FIG. 1.

As shown in FIG. 2, the facsimile main controller 2 of the Internet facsimile apparatus 1 includes a CPU (central processing unit) 21, a ROM (read only memory) 22, a RAM (random access memory) 23, a DCR (data compression and decompression) unit 24, a scanner 25, a printer 26, an image memory 27, and an operation panel 28. The CPU 21 controls the entire operations of the Internet facsimile apparatus 1, including a sequential facsimile operation, operations for notifying a request for replenishing a consumable product such as toner and a request for performing maintenance of resources such as a heater, E-mail operations for notifying a toner refilling request and a service maintenance request, and so forth.

The ROM 22 stores various control programs performed by the CPU 21. For example, programs of a toner refill request notification, a heater service maintenance notification, a toner refill completion notification, and a heater service maintenance completion notification are stored in the ROM 22.

The RAM 23 temporarily stores various kinds of data necessary for the CPU 21 when it performs the above-mentioned control programs and reserves a working memory area for the CPU 21.

The DCR 24 compresses, or encodes, image information when the information is transmitted and decompresses, or decodes, encoded image information when the information is received. Thereby, the time for transmission and receiving of image information is shortened in an efficient manner.

The scanner 25 uses a CCD (charge-coupled device) to serve as an image scanner that scans a document to read image data of the document at a predetermined resolution in accordance with an instruction sent from the CPU 21.

The printer 26 records the received image data on a recording sheet in accordance with an electrophotographic method using a photoconductive drum, toner, etc.

The image memory 27 saves images scanned by the scanner 25 and images received.

The operation panel 28 includes an LCD (liquid crystal display) and various kinds of operation keys, not shown, including switches for performing various operations during the facsimile transmission, switches for inputting various kinds of information related to E-mail, a display portion for displaying a toner near-end indication when a consumable product such as the toner needs replenishment, a display portion for displaying a heater failure, and so forth.

As shown in FIG. 3, the registration unit 3 registers various kinds of terminal information regarding the Internet facsimile apparatus 1, including a serial number, an E-mail address, a facsimile number, and facsimile TTI (transmitter terminal identification) information and serves as a terminal identification information registration means. The registration unit 3 further registers a mail address and a telephone number of the PC 13 used by the manager and serves as a manager registration means. The registration unit 3 further registers a mail address and a telephone number of the service depot system 16, to which the order for the consumable products such as toner is directed, and serves as a service depot registration means.

In addition, the registration unit 3 registers consumable product information, including toner ordering information that includes a type of toner, service contents, status information such as a toner near-end, in association with the service depot system 16 and serves as a consumable product information registration means.

The consumable product status detector 4 includes a toner amount detection sensor (not shown) which detects a remaining amount of toner and sends a signal to the facsimile main controller 2. The consumable product status detector 4 serves as a consumable product status detecting means.

The maintenance status detector 5 detects a status of a maintenance-needed resource such as a heater that heats a fixing roller (not shown) for fixing a toner image on a recording sheet and, for this purpose, includes a sensor (not shown) for detecting a voltage value of the heater and sends a signal to the facsimile main controller 2 when the voltage value is not maintained within a predetermined range. The maintenance status detector 5 serves as a maintenance detecting means.

The facsimile communications controller 6 executes Group 3 protocols to perform Group 3 facsimile communications.

The PSTN controller 7 connects the Internet facsimile apparatus 1 to the PSTN 17 and includes functions for automatically transmitting and receiving facsimile information.

The E-mail data generator 8 generates E-mail data based on various kinds of information and arbitrary repetitive documents registered in the registration unit 3 or data read from a document by the scanner 25.

The LAN controller 9 connects the Internet facsimile apparatus 1 to the LAN 12 so as to perform communications protocols to communicate with the PC 13 or with the service depot system 16.

The E-mail analyzer 10 analyzes E-mail received through the LAN 12 and serves as an analyzing means. In this example, the E-mail analyzer 10 analyzes E-mail with respect particularly to receipt acknowledgements to an order of a consumable product received from the service depot system 16 and to a request for a service maintenance received from the PC 13 or the service depot system 16.

The E-mail controller 11 transmits E-mail that is generated by the E-mail data generator 8 and provides information about a consumable product and/or maintenance of resource to the mail server through the SMTP via the LAN controller 9.

In the thus-configured Internet facsimile apparatus 1, the facsimile main controller 2 instructs the E-mail data generator 8 to generate E-mail for ordering a consumable product and the E-mail controller 11 to transmit the E-mail to the manager registered in the registration unit 3 when detecting an event such as that the toner needs to be replenished based on detection information from the consumable product status detector 4. In this case, the E-mail includes the terminal information, order contents, and information of a seller of the toner products such as the service depot system 16. Further, the facsimile main controller 2 instructs the E-mail data generator 8 to generate E-mail for notifying of completion of toner refilling and instructs the E-mail controller 11 to transmit the E-mail to the manager upon detecting that toner refilling is completed based on the detection information detected by the consumable product status detector 4.

Further, the facsimile main controller 2 instructs the E-mail data generator 8 to generate E-mail for requesting service maintenance and instructs the E-mail controller 11 to transmit the E-mail to the manager and to the service depot system 16, both registered in the registration unit 3, upon detecting that the heater is in need of service maintenance based on the detection information detected by the maintenance status detector 5. In this case, the E-mail includes the terminal information and information about the needed maintenance. Further, the facsimile main controller 2 instructs the E-mail data generator 8 to generate E-mail for notifying of completion of the heater maintenance and the E-mail controller 11 to transmit the E-mail to the manager upon detecting that the heater maintenance is completed based on the detection information detected by the maintenance status detector 5.

In this example, the facsimile main controller 2, the E-mail data generator 8, and the E-mail controller form an E-mail controlling means.

The facsimile main controller 2 displays through the operation panel 28 the receipt acknowledgements of an order for a consumable product and of a request for a service maintenance, analyzed by the E-mail data analyzer 10. Further, the facsimile main controller 2 stops displaying the receipt acknowledgements through the operation panel 28 upon detecting that the toner fulfilling is completed based on the detection information detected by the consumable product status detector 4 or that the heater maintenance is completed based on the detection information detected by the maintenance status detector 5. Thus, the facsimile main controller 2 forms a displaying means.

Further, the facsimile main controller 2 provides the above-mentioned notification to the facsimile number registered in the registration unit 3 through the facsimile communications, instead of E-mail, when the manager or the service depot system 16 is not capable of using E-mail.

Figure 4:
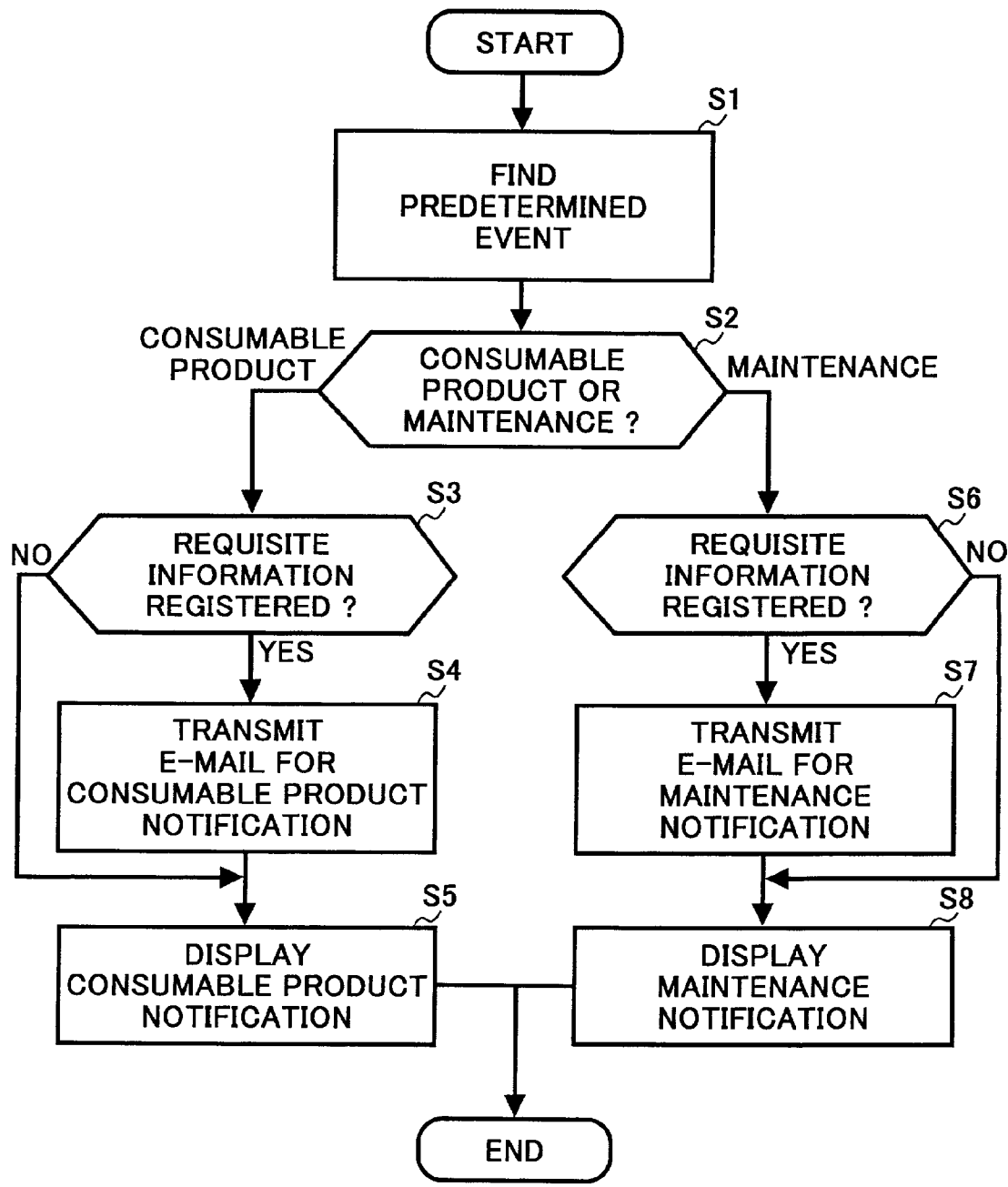
FIG. 4 is a flowchart for explaining exemplary procedures of ordering a toner refilling and a heater maintenance performed by the Internet facsimile apparatus of FIG. 1.

Referring to FIGS. 3-8B, an exemplary procedure related to the toner refilling is explained. FIG. 4 shows a flowchart of a procedure for ordering toner refilling and a procedure for ordering heater maintenance. The latter will be explained later. In Step S1, the facsimile main controller 2 finds an event by counting a predetermined number of pages printed or hours in operation and, in Step S2, checks if the consumable product status detector 4 has detected an event related to need for toner replenishing or if the maintenance status detector 5 has detected an event related to a need for heater maintenance. If the consumable product status detector 4 detects an event related to need for toner and the check result of Step S2 indicates that the need is for a consumable product, the facsimile main controller 2 determines that the remaining amount of toner is at a near end status and displays the event of the toner near end through the operation panel 28.

In Step S3, the facsimile main controller 2 determines if the information necessary for the transmission of E-mail, such as the terminal information, the manager information, and the service depot information, shown in FIG. 3, is registered in the registration unit 3. If the terminal information of the Internet facsimile apparatus 1, the manager information of the PC 13, and the service depot information of the service depot system 16 are determined as registered in the registration unit 3 and the check result of Step S3 is YES, the process proceeds to Step S4 in which the notification of the toner shortage and the toner ordering is sent to the manager. More specifically, in Step S4, the E-mail data generator 8 generates E-mail in a form such as shown in FIG. 6A, the E-mail controller 11 executes the mail transmission operation, and the LAN controller 9 transmits the E-mail to the mail server through the SMTP procedure via the LAN 12. This E-mail is transmitted to the PC 13 on the LAN 12.

The E-mail of FIG. 6A is an order sheet for ordering a supply of toner, indicating information of a mail address of the service depot system, information of the consumable product including a status of the remaining toner and the name of the product, and information of the sender including an E-mail address of the Internet facsimile apparatus 1 of the user, a serial number, and the name of the sender.

In Step S5, information according to the contents of the E-mail of FIG. 6A is displayed in a form such as shown in FIG. 6B on the LCD of the operation panel 28 after completion of the transmission of the E-mail. Then, the process ends.

From the above E-mail, the manager understands that toner type 2 is in short supply at the Internet facsimile apparatus 1 of the sales department. Therefore, if the toner is in stock, the manager sends the toner to the Internet facsimile apparatus 1 and if no toner is in stock, the manager transmits the E-mail to the service depot system 16 via the Internet 14.

Upon receipt of the E-mail, the service depot system 16 specifies the Internet facsimile apparatus 1 of the user and the requisite toner product from the contents of the E-mail and subsequently sends E-mail indicating a toner delivery schedule, as shown in FIG. 7A, to the user at the Internet facsimile apparatus 1 and the manager at the PC 13 via the Internet 14. At this time, the contents of the E-mail are displayed on the LCD displays in a form such as shown in FIG. 7B.

An operation of the Internet facsimile apparatus 1 at receipt of the E-mail from the service depot system 16 is explained with reference to the flowchart of FIG. 5. In Step S10, the Internet facsimile 1 receives the E-mail of FIG. 7A from the service depot system 16. In Step S11, the facsimile main controller checks if the status indicates either that the consumable product is in short supply or that the service maintenance is in need, or not. If, in this case, the status indicates that the consumable product is in short and the check result of Step S11 is YES, the facsimile main controller 2 determines in Step S12 if the sender of the E-mail is one of the manager and the service depot system 16.

Then, the E-mail data analyzer 10 analyzes the contents of the E-mail sent from the service depot system 16 and, if the address of the E-mail sender is determined as identical to the address of the service depot system 16, the facsimile main controller 2 determines that the E-mail was sent from the service depot system 16. In this case, the facsimile main controller 2 displays in Step S13 the text message of the E-mail as is, which is considered as corresponding to the receipt acknowledgement information sent from the service depot system 16. The display is through the LCD of the operation panel 28, such as shown in FIG. 7B.

The user of the Internet facsimile apparatus 1 sees on the display the message indicating that the toner is to be delivered on 30$^{th}$ of August and will refill the toner when it is delivered on 30$^{th}$ of August. After the toner refilling, the consumable product status detector 4 detects an event related to an indication that the toner refilling is completed. Then, in the Internet facsimile apparatus 1, the facsimile main controller 2 performs the operations of Steps S1-S3 FIG. 4 in the manners similar to those described above. But, in Step S4, the E-mail data generator 8 generates E-mail having a message that indicates the toner refilling has been completed, such as shown in FIG. 8A, to the manager registered in the registration unit 3. After transmission of the E-mail to the manager with the E-mail controller 11, the facsimile main controller 2 displays in Step S5 a message through the LCD indicating that the toner refilling has been completed, such as shown in FIG. 8B.

Consequently, from the information contained in the E-mail of FIG. 8A, such as the sender information, the serial number, and the E-mail address, the manager can confirm that the toner refilling has been completed at the Internet facsimile apparatus 1. At this time, the receipt acknowledgement information indicated through the LCD, such as shown in FIG. 8B, is discontinued.

Referring to FIGS. 3-5, and 9A-11B, an exemplary procedure with respect to heater maintenance is explained. In Step S1 of FIG. 4, the facsimile main controller 2 finds an event by counting a predetermined number of pages printed or hours in operation and, in Step S2, checks if the maintenance status detector 5 has detected an event indicating that the toner is in short supply or if the maintenance status detector 5 has detected an event indicating that the heater is in need of maintenance. If the maintenance status detector 5 has detected an event indicating that the heater is in need of maintenance and the check result of Step S2 indicates a need for maintenance, the facsimile main controller 2 determines that the heater is in a defective status and displays this status through the operation panel 28.

In Step S6, the facsimile main controller 2 determines if the information necessary for the transmission of E-mail, such as the terminal information, the manager information, and the service depot information, shown in FIG. 3, is registered in the registration unit 3. If the terminal information of the Internet facsimile apparatus 1, the manager information of the PC 13, and the service depot information of the service depot system 16 are determined as registered in the registration unit 3 and the check result of Step S6 is YES, the process proceeds to Step S7 in which the notification of the heater defect and the maintenance ordering is sent to the manager. More specifically, in Step S7, the E-mail data generator 8 generates E-mail in a form such as shown in FIG. 9A, the E-mail controller 11 executes the mail transmission operation, and the LAN controller 9 transmits the E-mail to the mail server through the SMTP procedure via the LAN 12. This E-mail is transmitted to the PC 13 on the LAN 12.

The E-mail of FIG. 9A is an order sheet for ordering service maintenance, indicating information of a mail address of the service depot system 16, information of the service maintenance including a status of the machine and an error code, and information of the sender including an E-mail address of the Internet facsimile apparatus 1 of the user, a serial number, and the name of the sender.

In Step S8, information according to the contents of the E-mail of FIG. 9A is displayed in a form such as shown in FIG. 9B, through the LCD of the operation panel 28 after completion of the transmission of the E-mail. Then, the process ends.

From the above E-mail, the manager understands that the heater is defective on the Internet facsimile apparatus 1 of the sales department and that the E-mail is also transmitted to the service depot system 16.

Upon a receipt of the E-mail, the service depot system 16 specifies the Internet facsimile apparatus 1 of the user and the requisite components for repair based on the contents of the E-mail and subsequently sends E-mail indicating a repair schedule, such as shown in FIG. 10A, to the user at the Internet facsimile apparatus 1 and the manager at the PC 13 via the Internet 14.

An operation of the Internet facsimile apparatus 1 at receipt of the E-mail from the service depot system 16 is explained with reference to the flowchart of FIG. 5. In Step S10, the Internet facsimile 1 receives the E-mail of FIG. 10A from the service depot system 16. In Step S11, the facsimile main controller checks whether or not the status indicates either that the consumable product is in short supply or that the service maintenance is in need. If, in this case, the status indicates that service maintenance is needed and the check result of Step S11 is YES, the facsimile main controller 2 determines in Step S12 if the sender of the E-mail is one of the manager and the service depot system 16.

Then, the E-mail data analyzer 10 analyzes the contents of the E-mail sent from the service depot system 16 and, if the address of the E-mail sender is determined as identical to the address of the service depot system 16, the facsimile main controller 2 determines that the E-mail was sent from the service depot system 16. In this case, the facsimile main controller 2 displays in Step S13 the text message of the E-mail as is, which is considered as corresponding to the receipt acknowledgement information sent from the service depot system 16, through the LCD of the operation panel 28, such as shown in FIG. 10B.

The user of the Internet facsimile apparatus 1 sees on the display the message indicating that the repair is performed on 30$^{th}$ of August, such as shown in FIG. 10B. After completion of the heater repair, the maintenance status detector 5 detects an event indicating that the heater repair is completed. Then, in the Internet facsimile apparatus 1, the facsimile main controller 2 performs the operations of Steps S1-S3 FIG. 4 in a manner similar to that described above. But, in Step S4, the E-mail data generator 8 generates E-mail having a message that indicates the heater repair has been completed, such as shown in FIG. 11A, to the manager registered in the registration unit 3. After transmission of the E-mail to the manager with the E-mail controller 11, the facsimile main controller 2 displays in Step S8 a message through the LCD indicating that the heater repair has been completed, such as shown in FIG. 11B.

Consequently, from the information contained in the E-mail of FIG. 11A, such as the sender information, the serial number, and the E-mail address, the manager can confirm that the heater maintenance has been completed on the Internet facsimile apparatus 1. At this time, the receipt acknowledgement information indicated with the LCD, such as shown in FIG. 11B, is discontinued.

Although the notification to the manager and the service depot system is performed with E-mail in this example, the communications may be performed with a facsimile message in an environment where E-mail is not available, which will have the same effect as in the E-mail environment.

In this example, the facsimile main controller 2 is configured to automatically display the text message of the E-mail sent from the service depot system. In addition, the facsimile main controller 2 may display a text message of the E-mail, sent from the manager, in which the manager explains intermediate status, such as shown in FIG. 12A. In this case, a message may be displayed on the LCD, such as shown in FIG. 12B.

Although this example uses text information of the E-mail as it is as examples of analysis with respect to formats of E-mail data, any specific format may be used.

The disclosed processes may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The implementation may also, or alternatively, use application specific integrated circuits or an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

This application claims priority to Japanese patent application No. JPAP2000-133419 filed on May 2, 2000 in the Japanese Patent Office, the entire contents of which are hereby incorporated by reference.

What is claimed as new and is desired to be secured by Letter Patent of the United States is:

1. An image forming apparatus capable of transferring and receiving data by email communication and facsimile communication and supervised by a manager who contacts a service depot when servicing is required, comprising:
   a consumable product status detector configured to automatically detect a status of said consumable product used in said image forming apparatus;
   a manager registration part configured to register a manager email address and telephone number of the manager who administers said image forming apparatus;
   a service depot registration part configured to register an email address and telephone number of a service depot;
   a terminal identification information registration part configured to register terminal identification information of said image forming apparatus, wherein said terminal identification information includes at least one of an E-mail address, a serial number, a facsimile number, facsimile TTI information, and a telephone number of said apparatus;
   a consumable product information registration part configured to register order details information, specification of said consumable product and identification of a supplier of the consumable product;
   an email controller part configured to send a first email communicating a request for supplying said consumable product, including the terminal identification information of the communications terminal apparatus, the order details information, specification of said consumable product and the identification of the supplier, to said manager email address registered in said manager registration part, when said consumable product status detector detects that said consumable product is nearly ended, and configured to send, when said consumable product status detector has detected that replenishment of the consumable product has been completed, a second email communicating that the replenishment of said consumable product has been completed,
   said request of the first email sent automatically to said manager (i) including an order form for sending to the service depot to order said consumable product and (ii) identifying the registered service depot email address of the supplier to which the order form is to be sent;
   an email analysis part configured to analyze a received email for receipt acknowledgement information indicating acknowledgement of receipt of the order, and response information responding to the order; and
   a display part configured to display various information, wherein the email controller part causes said display part to display a text message of the received email corresponding to the receipt acknowledgement information, causes said display part to stop displaying the receipt acknowledgement information which has been displayed in said display part after transmission of the second email indicating that the replenishment of the consumable product has been completed, to the manager and service depot, and causes said display part to display that the consumable product was replenished; and a facsimile controller part wherein said facsimile controller part communicates with at least one of said manager and service depot through said facsimile communication using said facsimile number registered in said terminal identification information registration part when said email communication is not available to at least one of said manager and said service depot.

2. An image forming apparatus as defined in claim 1, wherein said consumable product includes toner.

3. An image forming apparatus capable of transferring and receiving data by email communication and facsimile communication and supervised by a manager who contacts a service depot when servicing is required, comprising:

a maintenance status detector configured to automatically detect an event indicative of a defect in a maintenance component used in said image forming apparatus;

a manager registration part configured to register a manager email address and telephone number of the manager who administers said image forming apparatus;

a service depot registration part configured to register a service depot email address and telephone number of a service depot;

a terminal identification information registration part configured to register terminal identification information of said image forming apparatus, wherein said terminal identification information includes at least one of an email address, a serial number, a facsimile number, facsimile TTI information, and a telephone number of said apparatus;

a maintenance component information registration part configured to register order details information, specification of a maintenance component, and identification of said service depot;

detecting mean for automatically detecting an event indicating that said maintenance component is defective;

an email controller part configured to send a first email communicating a request for repair service, including the terminal identification information of the communications terminal apparatus, order details information, specification of a maintenance component and the identification of the event, to the respectively registered said manager and service depot email addresses automatically when said maintenance status detector detects said event, and configured to send, when said maintenance status detector detects said event, and configured to send, when said maintenance status detector has detected that the repair has been completed, a second email communicating that the repair has been completed, said request of the first email sent automatically to said manager (i) including an order form for ordering said repair service and (ii) identifying the registered service depot email address of the service depot;

an email analysis part configured to analyze a received email for receipt acknowledgement information indicating acknowledgement of receipt of the order, and response information responding to the order; and a display part configured to display various information, wherein the email controller part causes said display part to display a text message of the received email corresponding to the receipt acknowledgement information, causes said display part to stop displaying the receipt acknowledgement information which has been displayed in said display part after transmission of the second email indicating that the repair has been completed, to the manager and service depot, and causes said display part to display that the maintenance component was repaired; and a facsimile controller part wherein said facsimile controller part communicates with at least one of said manager and service depot through said facsimile communication using said facsimile number registered in said terminal identification information registration part when said E-mail communication is not available to at least one of said manager and said service depot.

4. An image forming apparatus as defined in claim 3, wherein said maintenance component includes a photoconductor.

5. An communications terminal apparatus capable of transferring and receiving data by email communication and facsimile communication and supervised by a manager who contacts a service depot when servicing is required, comprising:

a consumable product status detector configured to detect automatically a status of said consumable product used in said communications terminal apparatus;

a manager registration part configured to register a manager email address and telephone number of said manager;

a service depot registration part configured to register a service depot E-mail address and telephone number of a service depot;

a terminal identification information registration part configured to register terminal identification information of said communications terminal apparatus, wherein said terminal identification information includes at least one of an E-mail address, a serial number, a facsimile number, facsimile TTI information, and a telephone number of said apparatus;

a consumable product information registration part configured to register order details information, identification of a supplier of the consumable product and specification of said consumable product;

an email controller part configured to send a first E-mail requesting a delivery of said consumable product, including the terminal identification information of the communications terminal apparatus, the order details information, specification of said consumable product and the identification of the supplier, to said manager E-mail address registered in said manager registration part, automatically when said consumable product is determined to be in a short supply status based on detect information detected by said consumable product status detector, and configured to send, when said consumable product status detector has detected that replenishment of the consumable product has been completed, a second E-mail reporting that the replenishment of said consumable product has been completed, said first E-mail sent automatically to said manager (i) including an order form for sending to the supplier to order said consumable product and (ii) identifying the registered service depot E-mail address of the supplier to which the order form is to be sent;

an email analysis part configured to analyze a received email for receipt acknowledgement information indicating acknowledgement of receipt of the order, and response information responding to the order; and a display part configured to display various information, wherein the email controller part causes said display part to display a text message of the received email corresponding to the receipt acknowledgement information, causes said display part to stop displaying the receipt acknowledgement information which has been displayed in said display part after transmission of the second email indicating that the replenishment of the consumable product has been completed, to the manager and service depot, and causes said display part to display that the consumable product was replenished; and a facsimile controller part wherein said facsimile controller part communicates with at least one of said manager and service depot through said facsimile communication using said facsimile number registered in said terminal identification information registration part when said E-mail communication is not available to at least one of said manager and said service depot.

6. A communications terminal apparatus as defined in claim 5, wherein said identification of said supplier of said consumable product includes at least one of an E-mail address and a telephone number.

7. An communications terminal apparatus capable of transferring and receiving data by email communication and facsimile communication and supervised by a manager who contacts a service depot when servicing is required, comprising:

a maintenance status detector configured to detect automatically an event indicative of a need to repair a specific a maintenance component;

a manager registration part configured to register a manager email address and telephone number of said manager;

a service depot registration part configured to register a service depot E-mail address and telephone number of a service depot;

a terminal identification information registration part configured to register terminal identification information of said communications terminal apparatus, wherein said terminal identification information includes at least one of an E-mail address, a serial number, a facsimile number, facsimile TTI information, and a telephone number of said apparatus;

maintenance component information part configured to register order details information, specification of a maintenance component, and identification of said service depot;

detecting mean for automatically detecting an event indicating that said maintenance component is defective;

an email controller part configured to send a first email communicating requesting a repair service, including the terminal identification information of the communications terminal apparatus, order details information and the identification of the event, to said manager and service depot E-mail addresses registered in said manager and service depot registration parts, respectively, automatically when said maintenance status detector detects said event, and configured to send, when said maintenance status detector has been detected that the repair has been completed, a second email reporting completion of the repair, said first email sent automatically to said manager (i) including an order form for ordering said repair service and (ii) identifying the registered E-mail address of the service depot;

an email analysis part configured to analyze a received email for receipt acknowledgement information indicating acknowledgement of receipt of the order, and response information responding to the order; and a display part configured to display various information, wherein the email controller part causes said display part to display a text message of the received email corresponding to the receipt acknowledgement information, causes said display part to stop displaying the receipt acknowledgement information which has been displayed in said display part after transmission of the second email indicating that the repair has been completed, to the manager and service depot, and causes said display part to display that the maintenance component was repaired; and a facsimile controller part wherein said facsimile controller part communicates with at least one of said manager and service depot through said facsimile communication using said facsimile number registered in said terminal identification information registration part when said E-mail communication is not available to at least one of said manager and said service depot.

8. An communications terminal apparatus capable of transferring and receiving data by email communication and facsimile communication and supervised by a manager who contacts a service depot when servicing is required, comprising:

communications means for performing E-mail communications and facsimile communications;

consumable product status detecting means for detecting automatically a status of said consumable product used in said communications terminal apparatus;

manager registering means for registering a manager E-mail address and telephone number of said manager;

service depot registering means for registering a service depot E-mail address and telephone number of a service depot;

terminal identification information registering means for registering terminal identification information of said communications terminal apparatus, wherein said terminal identification information includes at least one of an E-mail address, a serial number, a facsimile number, facsimile TTI information, and a telephone number of said apparatus;

consumable product information registering means for registering order details information, specification of said consumable product and identification of a supplier of the consumable product;

email controlling means for sending a first E-mail requesting a delivery of said consumable product, including the terminal identification information of the communications terminal apparatus, the order details information, specification of said consumable product and the identification of the supplier, to said manager E-mail address registered in said manager registering means, automatically when said consumable product is determined to be in a short supply status based on detect information detected by said consumable product status detecting means, and for sending a second E-mail reporting that replenishment of the consumable product has been completed, as detected by said consumable product status detecting means, said first E-mail sent automatically to said manager (i) including an order form for sending to the supplier to order said consumable product and (ii) identifying the registered service depot E-mail address of the supplier to which the order form is to be sent;

email analyzing means for analyzing a received email for receipt acknowledgement information indicating acknowledgement of receipt of the order, and response information responding to the order; and display means for displaying various information, wherein the email controlling means causes said display part to display a text message of the received email corresponding to the receipt acknowledgement information, causes said display means to stop displaying the receipt acknowledgement information which has been displayed in said display means after transmission of the second email indicating that the replenishment of the consumable product has been completed, to the manager and service depot, and causes said display means to display that the consumable product was replenished; and facsimile controlling means for communicating with at least one of said manager and service depot through said facsimile communication using said facsimile number registered in said terminal identification information registering means when said E-mail communication is not available to at least one of said manager and said service depot.

9. A communications terminal apparatus as defined in claim 8, wherein said identification of said supplier of said consumable product includes at least one of an E-mail address and a telephone number.

10. An communications terminal apparatus capable of transferring and receiving data by email communication and facsimile communication and supervised by a manager who contacts a service depot when servicing is required, comprising:

communications means for performing E-mail communications and facsimile communications;

maintenance status detecting means for detecting automatically an event indicative of a need to repair a specific maintenance component;

manager registering means registering a manager E-mail address and telephone number of said manager;

service depot registering means for registering a service depot E-mail address and telephone number of a service depot;

terminal identification information registering means for registering terminal identification information of said communications terminal apparatus, wherein said terminal identification information includes at least one of an E-mail address, a serial number, a facsimile number, facsimile TTI information, and a telephone number of said apparatus;

registering means for registering order details information, specification of a maintenance component, and identification of said service depot;

detecting mean for automatically detecting an event indicating that said maintenance component is defective;

email controlling means for sending a first E-mail requesting a repair service, including the terminal identification information of the communications terminal apparatus, order details information, specification of a maintenance component, and the identification of the event, to said manager and service depot E-mail addresses registered in said manager registering means and service depot registering means, respectively, automatically when said maintenance status detecting means detects said event, and for sending, when said maintenance status detecting means has detected that the repair has been completed, a second E-mail reporting completion of the repair, said first E-mail sent automatically to said manager (i) including an order form for ordering said repair service and (ii) identifying the registered service depot E-mail address of the service depot;

email analyzing means for analyzing a received email for receipt acknowledgement information indicating acknowledgement of receipt of the order, and response information responding to the order; and display means for displaying various information, wherein the email controlling means causes said display means to display a text message of the received email corresponding to the receipt acknowledgement information, causes said display means to stop displaying the receipt acknowledgement information which has been displayed in said display means after transmission of the second email indicating that the repair has been completed, to the manager and service depot, and causes said display means to display that the maintenance component was repaired; and facsimile controlling means for communicating with at least one of said manager and service depot through said facsimile communication using said facsimile number registered in said terminal identification information registering means when said E-mail communication is not available to at least one of said manager and said service depot.

11. An method for ordering a consumable product for a communications terminal apparatus capable of transferring and receiving data by email communication and facsimile communication and supervised by a manager who contacts a service depot when servicing is required, said communications terminal including a processor with stored control programs for performing the steps comprising:

registering a manager E-mail address and telephone number of said manager;

registering a service depot E-mail address and telephone number of a service depot;

registering terminal identification information of said communications terminal apparatus, wherein said terminal identification information includes at least one of an E-mail address, a serial number, a facsimile number, facsimile TTI information, and a telephone number of said apparatus;

registering order details information, identification of a supplier of the consumable product and specification of said consumable product;

detecting automatically a status of said consumable product used in said communications terminal apparatus;

detecting automatically an event indicating that said consumable product is nearly ended;

sending a first E-mail communicating a request for supplying said consumable product, including the terminal identification information of the communications terminal apparatus, the order details information, specification of said consumable product and the identification of the supplier, to said manager E-mail address, automatically when said event is detected, said request sent automatically to said manager E-mail address (i) including an order form for sending to the service depot an order for said consumable product and (ii) identifying the registered service depot E-mail address of the service depot to which the order form is to be sent;

determining that replenishment of the consumable product has been completed;

sending, when it is determined that the replenishment of the consumable product has been completed, a second E-mail to the manager E-mail address and service depot E-mail address automatically to report the replenishment of said consumable product;

analyzing a received email for receipt acknowledgement information indicating acknowledgement of receipt of the order, and response information responding to the order;

displaying a text message of the received email corresponding to the receipt acknowledgement information, stopping display of the receipt acknowledgement information after transmission of the second email indicating that the replenishment of the consumable product has been completed, to the manager, and displaying that the consumable product was replenished; and communicating with at least one of said manager and service depot through said facsimile communication using the registered facsimile number when said E-mail communication is not available to at least one of said manager and said service depot.

12. A method as defined in claim 11, wherein said consumable product includes toner.

13. An method for ordering a repair service on a communications terminal apparatus capable of transferring and receiving data by email communication and facsimile communication and supervised by a manager who contacts a service depot when servicing is required, said communications terminal including a processor with stored control programs for performing the steps comprising:

registering a manager E-mail address and telephone number of said manager;

registering a service depot E-mail address and telephone number of a service depot;

registering terminal identification information of said communications terminal apparatus, wherein said terminal identification information includes at least one of an E-mail address, a serial number, a facsimile number, facsimile TTI information, and a telephone number of said apparatus;

registering order details information, specification of a maintenance component, and identification of said service depot;

detecting automatically an event indicating that said maintenance component is defective;

sending a first E-mail communicating a request for said repair service, including the terminal identification information of the communications terminal apparatus, the order details information, specification of the maintenance component, and the identification of the event, to said manager and service depot E-mail addresses, automatically when said event is detected, and said request sent automatically to said manager (i) including an order form for ordering said repair service and (ii) identifying the registered service depot E-mail address;

determining thereafter that repair of the maintenance component has been completed;

sending when it is determined that the repair of the maintenance component has been completed, a second E-mail to the manager E-mail address and service depot E-mail address automatically to report completion of the repair on the communications terminal apparatus;

analyzing a received email for receipt acknowledgement information indicating acknowledgement of receipt of the order, and response information responding to the order;

displaying a text message of the received email corresponding to the receipt acknowledgement information, stopping display of the receipt acknowledgement information after transmission of the second email indicating that the repair has been completed, to the manager, and displaying that the maintenance component was repaired; and communicating with at least one of said manager and service depot through said facsimile communication using the registered facsimile number when said E-mail communication is not available to at least one of said manager and said service depot.

14. A method as defined in claim 13, wherein said maintenance component includes a photoconductor.

* * * * *